United States Patent [19]

Mueller et al.

[11] 4,351,271
[45] Sep. 28, 1982

[54] REFRIGERATED RECEIVER

[75] Inventors: Paul Mueller; Daniel C. Manna; Ray A. Prine, all of Springfield, Mo.

[73] Assignee: Paul Mueller Company, Springfield, Mo.

[21] Appl. No.: 184,128

[22] Filed: Sep. 4, 1980

[51] Int. Cl.³ .............................................. A01J 9/04
[52] U.S. Cl. .............................. 119/14.09; 119/14.18; 119/14.46
[58] Field of Search ............... 119/14.09, 14.18, 14.05, 119/14.46; 141/59, 82, 91, 92; 62/324.1, 342, 303; 134/105, 106, 107, 108

[56] References Cited

U.S. PATENT DOCUMENTS

| | | | |
|---|---|---|---|
| 2,283,904 | 5/1942 | Baumgarden | 31/4 |
| 2,403,272 | 7/1946 | Freer | 62/141 |
| 2,418,994 | 4/1947 | Taylor | 62/141 |
| 2,532,557 | 12/1950 | Kingston | 141/59 |
| 2,576,050 | 11/1951 | Soden | 119/14.09 X |
| 2,598,751 | 6/1952 | Berkowitz et al. | 62/141 |
| 2,638,758 | 5/1953 | Daun | 62/141 |
| 2,742,876 | 4/1956 | Duncan | 119/14.09 |
| 2,792,690 | 5/1957 | Flynn | 62/4 |
| 2,800,776 | 7/1957 | Woodmansee | 62/141 |
| 2,824,431 | 2/1958 | Pearson | 62/141 |
| 2,840,996 | 7/1958 | Steinhorst et al. | 62/185 |
| 2,877,992 | 3/1959 | Niemi | 257/199 |
| 2,937,856 | 5/1960 | Thomson | 257/245 |
| 3,035,543 | 5/1962 | Duncan et al. | 119/14.09 |
| 3,139,857 | 7/1964 | Merritt et al. | 119/14.46 |
| 3,254,700 | 6/1966 | Pellegrini | 165/12 |
| 3,271,968 | 9/1966 | Karnath | 62/59 |
| 3,458,917 | 8/1969 | Mueller | 20/157.3 |
| 3,605,421 | 9/1971 | Patrick | 62/7 |
| 3,824,801 | 7/1974 | Laudato, Jr. | 62/201 |
| 3,881,901 | 5/1975 | Williams | 62/392 |
| 3,882,693 | 5/1975 | Hiller | 62/394 |
| 3,959,986 | 6/1976 | Ledermann | 62/324 |
| 3,998,070 | 12/1976 | Mueller | 62/393 |
| 4,013,043 | 3/1977 | Kirwan | 119/14.09 |
| 4,034,711 | 7/1977 | Bender et al. | 119/14.05 |
| 4,036,621 | 7/1977 | Burton | 62/394 |
| 4,055,963 | 11/1977 | Shoji et al. | 62/238 |
| 4,143,532 | 3/1979 | Khimenko et al. | 72/56 |

FOREIGN PATENT DOCUMENTS

| | | | |
|---|---|---|---|
| 735584 | 8/1955 | United Kingdom | 119/14.09 |
| 743772 | 1/1956 | United Kingdom | 119/14.09 |

*Primary Examiner*—Hugh R. Chamblee
*Attorney, Agent, or Firm*—Rogers, Eilers & Howell

[57] ABSTRACT

A refrigerated receiver in an automatic milking system has a coiled plate type heat exchanger disposed therein for pre-cooling milk before it is pumped into a milk cooling and storage tank. The heat exchanger is adapted for use in a direct expansion refrigeration system which can be operated in a heating mode to heat wash water as it is circulated through the system. The coiled plate type heat exchanger can be cleaned and inspected while in place inside the generally cylindrically shaped receiver unit as it is substantially vertically oriented with a generally annular space between successive turns of the coiled plate.

29 Claims, 6 Drawing Figures

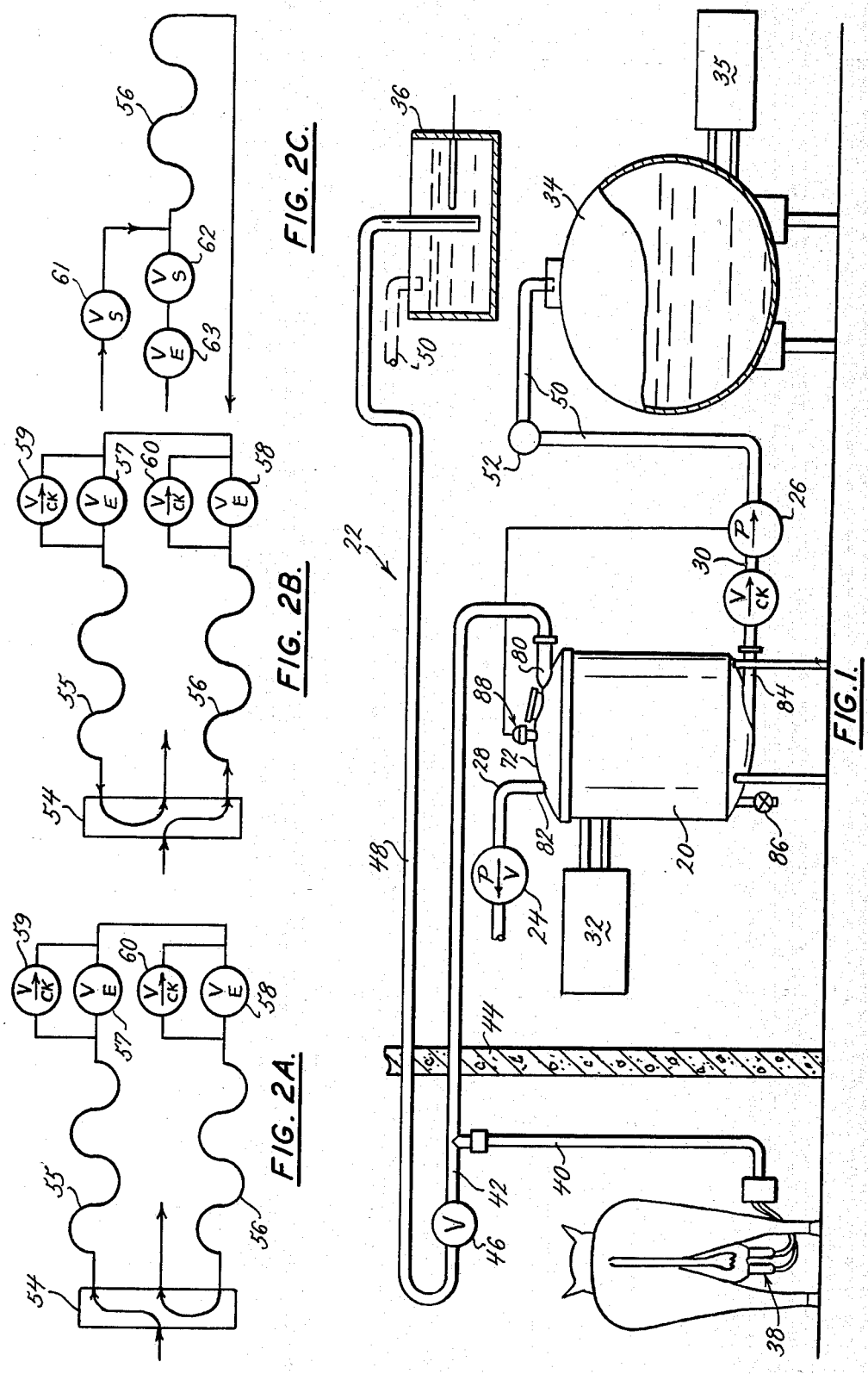

REFRIGERATED RECEIVER

BACKGROUND AND SUMMARY

Automatic milking systems have over the years revolutionized dairy farm operations which used to rely on hand milking to collect milk from cows. These automatic systems generally have a vacuum pressure line which extends from a teat-cup cluster fastened to a cow's udder to a milk collection line which transports the warm milk from the cow to a receiver. The receiver is generally cylindrical or cup-like in shape and separates the milk out by gravity from the vacuum to create a liquid seal at its bottom. A liquid pump conveys the warm milk into a milk cooling and storage tank where it is then cooled and stored until picked up.

To guarantee the continued quality and cleanliness of the milk, local Health Department standards almost always require some type of thorough cleaning and inspection of the system on a daily basis to remove any impurities from the system and prevent any buildup which might contaminate the new milk. This requirement is usually fulfilled by flushing the individual vacuum lines, milk collection line, receiver, and other surfaces which handle the milk with wash water maintained at or above a minimum temperature. This flushing is typically performed by circulating wash water through the system much in the same manner that milk is collected. An auxiliary wash pipeline parallels the milk collection line and extends from a wash basin filled with wash water to the end of the collection line. The milk line from the milk pump is removed from the cooling and storage tank and placed in the wash basin, to complete the wash water's return path. The system is then operated by turning on the vacuum pump and milk pump to circulate wash water through the milk collection line, the receiver and the milk pump.

Because the milk collection line is typically a long pipe extending through an unheated barn, it acts much as a radiator, making it difficult to maintain the wash water at its prescribed temperature. To ensure compliance with the minimum temperature standard and ensure adequate cleaning, it is oftentimes necessary to continuously heat the water in the wash basin with an auxiliary heater, when the recirculating flushing technique is used. This auxiliary heater is used only during the cleaning cycle, and of course, costs some money to buy and requires some additional energy to run.

Another important feature which has been developed as part of the automatic milking systems is the water chilled pre-cooler, which pre-cools the milk after it is pumped and before it enters the tank. These pre-coolers reduce the temperature of the milk from the 90° to 100° F. (32° to 38° C.) at which it is taken from the cow to some lower temperature after it passes through the milk pump. There are several important advantages to pre-cooling the milk which make it desirable to achieve this pre-cooling as quickly as possible after taking it from the cow. For example, any churning or agitation of warm milk tends to promote hydrolytic rancidity, which in turn decreases the expected shelf life, and adversely affects the taste. This is particularly true when the milk is in the critical temperature range which is close to the body temperature of the cow. Unfortunately, most pre-cooling systems presently available are designed to operate under positive pressure conditions such as exist downstream from the milk pump as opposed to vacuum conditions which exist upstream. Thus, the warm milk undergoes turbulence in the receiver and experiences severe agitation caused by the powerful pumping action of the milk pump while the milk is in the critical temperature range.

Another important advantage attained by pre-cooling is that the system avoids mixing 90° F. (32° C.) milk directly in with the 38° F. (3° C.) milk in the tank which could significantly increase the overall temperature of the milk contained therein. Typically, another standard adopted by most local Health Departments requires that the overall temperature of the milk contained in the tank not exceed a temperature of 50° F. (10° C.) or the like. As can be appreciated, milk with a temperature of 90° F. (32° C.) at a substantial flow rate can rapidly increase the temperature of the stored milk. To prevent an excessive temperature rise, refrigeration units on the milk cooler are continuously operated throughout the milking and for some longer period thereafter to completely refrigerate the milk and bring it back down to the 38° F. (3° C.) storage temperature. Generally, any cooled milk in a tank which exceeds the 50° F. (10° C.) temperature limit must be dumped or sold at a lower grade with a correspondingly lower price, thereby presenting a substantial risk each time warm milk is blended with the cold milk being stored in the milk cooling and storage tank. Furthermore, as automatic temperature recorders are often required on the tank, a dairy farm operator can undergo some psychological tension as he watches the temperature of the entire tank move up during each milking.

By pre-cooling the warm milk to some lower temperature prior to blending with the already cooled milk, this rapid rise in temperature is avoided, thereby lessening the risk of loss. Furthermore, it is more energy efficient to pre-cool the heated milk to a temperature approaching that of the storage temperature instead of dumping the heated milk into the tank and refrigerating what may be a large quantity of milk over a smaller and lower temperature range. With pre-cooling, one refrigeration unit in the pre-cooler can work on just the new milk at a higher, more energy efficient temperature range of approximately 90° F. (32° C.) down to 50° F. (10° C.). Without pre-cooling, several larger refrigeration units on the tank must work on the larger amount of milk contained in the tank at a lower, less energy efficient temperature range of approximately 50° F. to 38° F. (10° C. to 3° C.). Thus, pre-cooling offers the potential for making the overall system more energy efficient.

A drawback of the prior art pre-coolers is that they generally circulate cold well water or the like through a baffle arrangement in the milk line to achieve the refrigerating effect. However, these systems require a large quantity of water, typically as much as twice the amount of milk processed to achieve a significant temperature change. This can be a rather wasteful use of what may be a limited supply of well water, or an expensive use of municipal water. Of course, these systems are not even feasible in more arid areas of the country, including parts of Texas and Oklahoma. Furthermore, except in certain northern areas of the country, the temperature of available well water does not nearly approach the desired ultimate temperature of the milk which decreases the effectiveness of the system. Another type of water pre-cooler uses a separate refrigeration system to chill the water. However, all of the water chiller types of pre-coolers operate at a lower, less energy efficient temperature range as they rely on water in its liquid state as an intermediate cooling medium.

Some systems in the prior art have attempted to move the pre-cooling function upstream of the milk pump by providing a heat exchanger inside the receiver. The heat exchanger generally includes a plurality of horizontally disposed baffles which force the milk through a circuitous path to ensure sufficient contact to achieve the desired cooling effect. An example of one such system is shown in U.S. Pat. No. 3,271,968. Although these prior art systems do provide somewhat limited pre-cooling of milk upstream from most other prior art systems, their heat exchanger design creates additional problems which greatly limit their effectiveness.

As explained above, cleanability and inspectability are of primary concern in a milk handling system. However, with the baffling and generally horizontally disposed surfaces of the prior art receiver enclosed heat exchangers, substantial disassembly by hand is required to either clean or inspect, which can be time consuming and expensive. Furthermore, the baffling and horizontally disposed surfaces slow up the velocity of the milk through the system and inherently limit the throughput capacity of the entire system. This is a very expensive price to pay to achieve the somewhat limited pre-cooling of a water chilled system with a receiver enclosed heat exchanger, making these systems of questionable advantage over the downstream pre-coolers.

To solve the problems left unresolved by the prior art, and to meet a long felt need in the industry, applicants have succeeded in developing a receiver enclosed pre-cooler having a flow through design and an increased refrigeration capability to achieve a much higher flow rate, and which can be cleaned and inspected in place using the standard flushing technique of the prior art. Furthermore, applicants' heat exchanger may be used to heat the wash water as the system is flushed, thereby eliminating the need for auxiliary heaters previously required. Applicants' refrigerated receiver unit has a coiled plate type heat exchanger which is adapted for use with a direct expansion refrigeration system to utilize the inherently higher energy efficiency of such a system over the water chilled systems. The coiled heat exchanger is disposed in a substantially vertical orientation inside the receiver with virtually all of the heat exchange surface being vertical and parallel to the flow of the milk through the receiver. Thus, a significantly increased throughput is available as there are no horizontal baffles as in prior art designs to slow the velocity of the milk. Furthermore, these substantially vertical surfaces and flow through design permit the heat exchanger and receiving unit to be cleaned by the circulation of cleaning water therethrough, with additional agitation provided by an atmospheric valve which intermittently opens to agitate the water in the receiver against the vacuum created by the vacuum pump. The ability to be cleaned in place represents a significant advance over the prior art designs as it eliminates the time consuming and expensive disassembly and hand cleaning that would have been required with the prior art. An inspection port in the top of the receiver permits visual inspection of substantially all of the coiled heat exchanger as it remains in place which is another feature not present in the prior art designs. Prior art systems had to be disassembled to be inspected.

Applicants' heat exchanger offers another significant advantage over the prior art as the refrigeration system may be run in reverse, as a heat pump, or operated in a hot gas bypass mode or "defrost" mode to heat the liquid being circulated through the receiver. Thus, the wash water may be directly heated by the heat exchanger as it passes through the system during the cleaning cycle. This not only counteracts the tendency of the wash water to dissipate heat rapidly as it traverses the milk collecting line, but also serves to heat the very surface which is toughest and most important to clean. By reverse cycling the heat exchanger and receiver, the temperature of the wash water may be maintained well above the minimum standards set by the local Health Department to ensure that the system is thoroughly cleaned during washing. This eliminates the requirement of the prior art systems for a separate heater to be immersed in the wash basin or wash line to re-heat the water as it circulates through the system during the cleaning cycle. Thus, applicants' refrigerated receiver serves a dual purpose by refrigerating milk as it passes through the receiver and also heating wash water as it is circulated therethrough during the cleaning cycle.

Applicants' flow through, vertically disposed, coiled plate type heat exchanger also eliminates the horizontal surfaces and baffling of prior art refrigerated receiver designs which itself created a turbulence in the milk. In applicants' device, the milk contacts the plate surfaces and smoothly flows over them in a thin film which increases the effectiveness of the heat exchanger and which accelerates the cooling process. In the prior art horizontally disposed baffle systems, milk "puddles" before flowing from one baffle to another which creates an indirect flow of milk tending to trap contaminates and lead to blockages where bacteria can collect and grow, possibly causing spoiling and rancidity. This problem is exacerbated by the small orifices which lead from one baffle to another and which are offset to actually prevent the direct flow through of milk. With applicants' device, a large generally annular space is provided between successive turns which eliminates any tendency of the receiver to clog and instead will pass through all but the largest contaminants to a filter which may be quickly cleaned or changed.

There are many additional benefits and features of applicants' device and these are more fully explained in the drawings and description of the preferred embodiment which follows.

BRIEF DESCRIPTION OF THE DRAWINGS

FIG. 1 is a schematic representation of an automatic milking line with applicants' refrigerated receiver included therein;

FIG. 2A is a partial schematic diagram of the refrigeration system indicating refrigerant flow for cooling in the receiver;

FIG. 2B is a partial schematic diagram of same refrigeration system as FIG. 2A except refrigerant flow is indicated for heating in the receiver;

FIG. 2C is a partial schematic diagram of an alternate refrigeration system indicating refrigerant flow for a defrost mode in the receiver;

DETAILED DESCRIPTION OF THE PREFERRED EMBODIMENT

Figure 4:
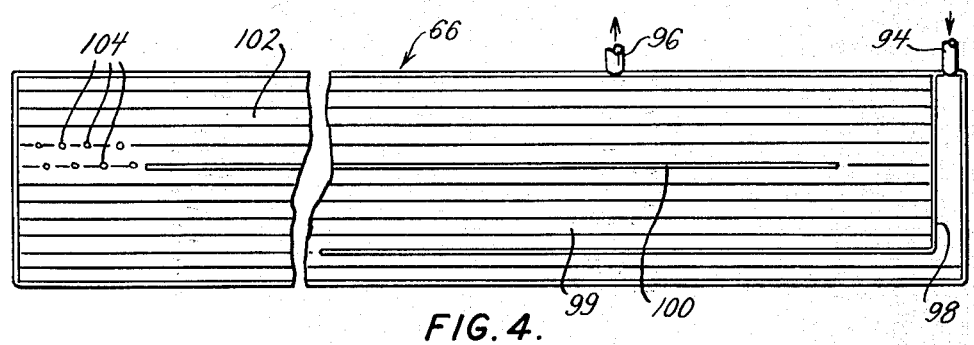
FIG. 4 is a side view of the plate type heat exchanger showing the baffling and refrigerant inlet and outlet before the exchanger is coiled.

Applicants' refrigerated receiver 20 is shown in FIG. 1 as a component of a typical automatic milking system 22 as might be found on a dairy farm. As shown in the drawing, the majority of the system is housed in a milk room and includes the receiver 20, a vacuum pump 24 and milk pump 26 along with their respective pipeline feeds 28, 30, a refrigeration unit 32, a milk cooling and storage tank 34, with its refrigerating unit 35 and a wash basin 36. Out in the milking parlor, a teat-cup cluster 38 attaches to the cow and milk is drawn from the cow through a riser pipe 40 and into a common milk collection line 42. As can be appreciated, a plurality of riser pipes 40 and teat-cup clusters 38 would usually extend along the common milk collection line 42, but only one such milking station is shown in FIG. 1 for purposes of illustration. The milk collection line 42 might typically extend through a substantial portion of the unheated barn area before entering the sanitary area through wall 44. A valve 46 is shown at the end of milk collection line 42 and serves as a connection point for auxiliary wash line 48 which also extends through wall 44 and back to wash basin 36. A milk delivery line 50 extends from the milk pump 26 and into the tank 34 through a swivel connection 52. During the wash cycle, the milk line 50 is withdrawn from the tank 34 and swivel 52 permits it to be swung adjacent to and inserted into wash basin 36 as is indicated by phantom lines in FIG. 1.

A direct expansion refrigeration system is used to provide the cooling and heating in the receiver 20 as is shown in FIGS. 2A and 2B, or alternately with the system shown in FIG. 2C. As shown in FIGS. 2A and 2B, a four way reversing valve 54 directs the flow of refrigerant through a condenser 55, an evaporator 56, a pair of expansion valves 57, 58 and a pair of check valves 59, 60. The evaporator 56 is disposed within the receiver 20 and is shown in greater detail in FIGS. 3 and 4. Refrigerant flow is indicated in FIG. 2A for operation of the receiver 20 in the cooling mode. In the cooling mode, check valve 59 provides a bypass for expansion valve 57 while check valve 60 closes and refrigerant may only flow through expansion valve 58, as is required for efficient operation of evaporator 56.

Refrigerant flow for operation of the same system in the heating mode is shown in FIG. 2B. By reversing the four way valve 54, the refrigerant heats evaporator 56, bypasses expansion valve 58 through check valve 60, flows through expansion valve 57 and then condenser 55. Thus, the system of FIGS. 2A and 2B is operated somewhat similarly to that of a heat pump to selectively heat or cool the evaporator 56 disposed within receiver 20.

An alternate system may be used as shown in FIG. 2C and includes the evaporator 56, solenoid valves 61, 62 and expansion valve 63. During the cooling mode, solenoid valve 61 is closed and solenoid valve 62 is open, so that refrigerant can flow through evaporator 56, solenoid valve 62 and expansion valve 63 and return to the condensing unit (not shown). In this mode, refrigerant does not flow through solenoid valve 61 and its associated line. During the heating mode, solenoid valve 61 is open the solenoid valve 62 is closed so that refrigerant in a hot gas state may be circulated from the compressor, through evaporator 56, and back to the condensing unit, much as in a defrost mode. Refrigerant flow for the heating or defrost mode is shown in FIG. 2C. Either mode of operation might be used in a typical refrigeration system 32 with applicants' refrigerated receiver 20 to heat wash water as it is circulated through the automatic milking system 22, thereby eliminating the requirement of an auxiliary heater in the wash basin. Furthermore, direct heating of the evaporator 56 significantly improves the cleaning effect of the wash water on the most difficult, and most important, element in the system to be cleaned.

Figure 3:
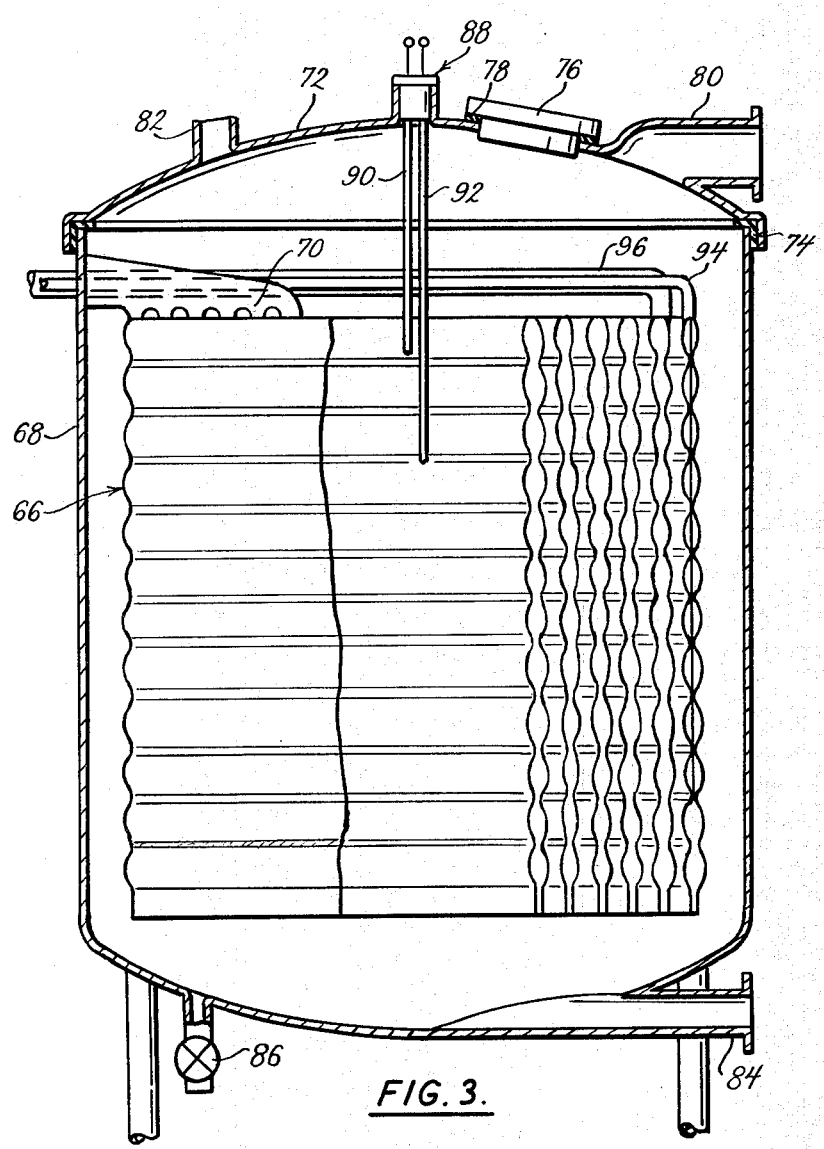
FIG. 3 is a cross-sectional view of the refrigerated receiver partially broken away to detail the coiled plate type heat exchanger.

Applicants' refrigerated receiver 20 is shown in more detail in FIG. 3 and includes a coiled plate type heat exchanger 66 supported from the side wall 68 of the generally cylindrical receiver by one or more hanger units 70 which is welded to the successive turns of the heat exchanger 66 to hold them in a spaced apart relationship. Heat exchanger 66 corresponds to the evaporator 56 shown schematically in FIGS. 2A-2C. A cap 72 and gasket 74 are held on the top of the receiver 20 by the vacuum pressure developed therein. Similarly, a glass observation port hole 76 and gasket 78 are held in place in the cap 72. A milk inlet 80 in the cap 72 directs the flow of milk into the receiver 20 immediately above the plurality of turns formed in the heat exchanger 66. A vacuum outlet 82 in the cap 72 connects to feed pipe 28 leading to vacuum pump 24, as shown in FIG. 1. In the bottom of receiver 20, a milk outlet 84 provides a connection point for milk feed pipe 30 leading to milk pump 26, also shown in FIG. 1. Thus, a liquid seal may be formed in the receiver 20 through the natural tendency of milk to settle to the bottom of the receiver 20 and completely cover milk outlet 84 so that the milk may be removed from the receiver 20 by the milk pump 26. An atmospheric valve 86 is also provided near the bottom of the receiver 20 and is used during the wash cycle, as will be explained later.

A probe control 88 includes a high level probe 90 and a low level probe 92 for electrically sensing the level of milk in the receiver 20 to control the operation of milk pump 26, as is known in the art. In this manner, the milk pump 26 may be operated to prevent the accumulation of too much milk in the receiver 20 and also prevent the pumping dry of the receiver 20 which would interrupt the liquid seal and cause the pump 26 to cavitate.

A refrigerant inlet 94 and a refrigerant outlet 96 extend from the heat exchanger 66 and through the side wall 68 of the receiver 20 to provide connections for the refrigeration unit 32. As shown in FIG. 3, the surface of the heat exchanger 66 is generally wavy to increase the total heat exchange surface presented to the milk as it flows down the side walls of the heat exchanger 66. Thus, a greater cooling effect may be achieved than with a heat exchanger 66 having straight side walls.

In FIG. 4, the heat exchanger 66 is shown in an uncoiled configuration and includes a first baffle 98 which extends along and parallel to a side and the bottom of the heat exchanger 66 closest to the refrigerant inlet 94. This baffle 98 directs the flow of refrigerant to the approximate center bottom of the heat exchanger 66 before it is permitted to expand within a central portion 99 thereof. This ensures a balanced refrigerant effect throughout the entire plate. A second baffle 100 separates an upper portion 102 from the central portion 99 of the plate and a plurality of spot welds 104 are positioned between the end of the second baffle 100 and the opposite side wall of the plate. This upper portion 102 defines a superheating portion of the plate and provides an increased cooling effect. The refrigerant outlet 96 is positioned along the upper edge of the plate, somewhat closer to the refrigerant inlet 94 than the opposite edge of the plate so as to provide an equal pressure drop for refrigerant traversing either edge of second baffle 100, thereby achieving a balanced cooling effect across the entire surface of the plate. It is believed this offset position of outlet 96 is necessary to compensate for the effects of the coiling of the plate, with the left edge of the plate being near the center of the coil.

The baffles 98, 100 and positions of refrigerant inlet and outlet 94, 96 are chosen to maximize the operation of heat exchanger 66 as an evaporator 56, as the main task of heat exchanger 66 is to cool milk and function as a pre-cooling unit. However, as the refrigeration unit 32 is reverse operated or put in a defrost mode, the heat exchanger 66 is sufficiently laid out to operate as a condenser 56 and provide heat to wash water as it is circulated through the automatic milking system 22, including receiver 20.

OPERATION

Applicant's refrigerated receiver provides effective pre-cooling of milk upstream from the pump by a coiled plate type heat exchanger which has substantially vertical surfaces to provide maximum milk throughput and also permit cleaning of the receiver and heat exchanger in place. Another additional feature of applicants' pre-cooler unit is that the refrigeration system may be reverse operated or put in a defrost mode to cause the heat exchanger to operate in a heating mode as the system is cleaned. This eliminates the requirement of an auxiliary heater for the wash water and also ensures that the heat exchanger itself is thoroughly cleaned.

During a milking, milk enters under vacuum into the receiver through the milk inlet where gravity causes the milk to flow over the coiled plate before reaching the bottom of the receiver. The milk accumulates in the bottom of the receiver and is further cooled by the heat exchanger until the probe control senses that an adequate amount of milk is present to run the milk pump. The milk pump is then cycled on and the level of milk drops as the cooled milk is pumped into the milk cooling and storage tank. The milk cooler refrigeration units 35 finish the refrigeration of the milk by bringing it down to the storage temperature, which may be somewhat below the pre-cooled temperature. However, the pre-cooled temperature is substantially less than the 90° to 100° F. (32° to 38° C.) temperature of the milk as it is taken from the cow and approximately 50° F. (10° C.) or less.

It should be noted that immediately upon entry into the receiver, the milk is subjected to immediate cooling by coming in contact with the coiled plate of the heat exchanger so that the warm milk experiences a minimum amount of turbulence. Furthermore, there is only the narrow upper surface of the coiled plate and no horizontal baffles to interrupt the flow of milk through the coiled plate. Thus, the cyclical operation of the milk pump and the unobstructed milk path permit the milk to stratify to some extent within the receiver and as the milk outlet is at the very bottom of the receiver, milk having the lowest temperature is pumped out of the receiver while the warmer milk remains in contact with the coiled heat exchanger. The probe control also assures the maintenance of a liquid seal at the bottom of the receiver by cycling the milk pump off as the milk level is lowered beyond the depth of the low level probe. Thus, air bubbles and the like are kept out of the milk pipeline which would increase the amount of turbulence experienced by the milk as it is pumped and also prevents damage to the pump.

After milking has been completed, or whenever a cleaning of the system is required, applicants' refrigerated receiver is conveniently cleaned in place with no disassembly or hand operation required over that of a system without applicants' refrigerated receiver. The milk line is swiveled from the milk tank and into the wash basin where a quantity of wash water is prepared having the proper temperature. The auxiliary wash line is connected to the milk collection line through the proper valve and the individual teat-cup clusters and riser pipes are disconnected and sealed off. The refrigeration unit is converted into its heat pump or defrost mode so that the heat exchanger contained within the receiver unit is operated as a condenser to supply heat to the wash water as it is circulated through the system. The system is then started up to circulate the wash water by turning on the vacuum pump and milk pump, as in the milking cycle. As the wash water enters the receiver, it is heated by the heat exchanger which significantly improves the cleaning effect of the wash water and replaces the heat lost by the radiating effect of the milk collection line. This also significantly aids the cleaning of the surface of the heat exchanger as a heated surface is much more easily and completely cleaned. This is especially important as the heat exchanger has an uneven surface and directly contacts the milk by being immersed therein, thus making it susceptible to the collection of contaminants and the like. To aid in creating turbulence in the receiver during cleaning, the atmospheric valve in the receiver is opened intermittently and works against the vacuum in the system to literally explode the wash water against the coils of the heat exchanger to help knock loose any film or accumulation of contaminants otherwise tending to collect therein. The observation port in the top of the receiver permits a careful inspection of the heat exchanger and receiver without disassembly to confirm that it has been thoroughly cleaned. The observation port also permits viewing of the receiver interior during a milking run to confirm that milk is being received, and is flowing smoothly through the coiled plate. A wash control (not shown) may be used to automatically operate the atmospheric valve during the cleaning cycle.

Various changes and modifications to applicants' refrigerated receiver would be apparent to one of ordinary skill in the art upon a reading of applicants' disclosure. A preferred embodiment has been disclosed by applicants as a means of illustrating their invention, but any changes and modifications are part of applicants' invention, the teaching of which is limited only by the scope of the claims appended hereto.

What we claim is:

1. A refrigerated receiver for cooling milk and separating it from vacuum in an automatic milking line, said receiver being substantially cylindrically shaped with a heat exchanger disposed therein, said heat exchanger comprising a coiled plate having multiple turns, a warm milk inlet at the top of the receiver and positioned to direct the flow of the milk directly onto the coiled plate, a vacuum outlet, a cool milk outlet at the bottom of the receiver, means to operate the heat exchanger in a heating mode during a cleaning cycle to heat a cleaning fluid as it is circulated through the receiver, and means to agitate the cleaning fluid in said receiver as it is being circulated therethrough.

2. The receiver unit of claim 1 further comprising means to visually inspect a substantial portion of the surface of said heat exchanger as it remains disposed within said receiver unit.

3. The receiver unit of claim 1 wherein said heat exchanger is substantially vertically disposed within said receiver and supported by its upper end therefrom.

4. The receiver unit of claim 1 wherein said heat exchanger is oriented within said receiver so that a substantial portion of its heat exchanging surface is parallel to the direction of milk flow through said receiver, thereby minimizing turbulence in the milk as it passes therethrough.

5. The receiver unit of claim 1 wherein said heat exchanger is arranged to permit stratification of milk within the receiver as it is cooled.

6. The receiver unit of claim 1 wherein said heat exchanger has a refrigerant inlet and a refrigerant outlet, and baffle means in said exchanger to ensure that refrigerant flows through a substantial portion of said exchanger.

7. The receiver unit of claim 6 wherein the heat exchanger includes a superheating section substantially separated from the rest of the heat exchanger by said baffle means.

8. The receiver unit of claim 1 further comprising a direct expansion refrigeration system operatively connected to said heat exchanger.

9. The receiver unit of claim 8 wherein said refrigeration system has means to deliver either heated refrigerant to thereby operate said heat exchanger in a heating mode, or cooled refrigerant to thereby operate said heat exchanger in a cooling mode.

10. The receiver unit of claim 9 wherein said refrigeration unit includes a second heat exchanger, a compressor, said valve means to direct the flow of refrigerant from said compressor to either of said heat exchangers.

11. The receiver unit of claim 10 wherein said heat exchangers function as a condenser and an evaporator, said valve means having means to redirect the flow of refrigerant in said refrigeration system to change the function of said heat exchangers.

12. The receiver unit of claim 1 further comprising means to maintain a liquid seal at said outlet.

13. The receiver unit of claim 12 wherein said receiver has means to sense the level of milk therein, said sensing means having means to control the flow of milk through the receiver outlet in response thereto.

14. The receiver unit of claim 14 wherein said sensing means includes at least one probe extending into said receiver.

15. A refrigerated receiver for cooling milk and separating it from vacuum in an automatic milking line, said receiver being substantially cylindrically shaped with a heat exchanger disposed therein, said heat exchanger comprising a coiled plate having multiple turns, at least one bracket secured to the upper edge of said turns of the plate to maintain them in a spaced apart relationship, said bracket mounting the heat exchanger to a side wall of the receiver, a warm milk inlet at the top of the receiver and positioned to direct the flow of the milk directly onto the coiled plate, a vacuum outlet, a cool milk outlet at the bottom of the receiver, liquid level probes extending into the interior of the receiver with means to control the withdrawal of milk from said milk outlet, means to operate the heat exchanger in a heating mode during a cleaning cycle to heat a cleaning fluid as it is circulated through the receiver, and means to intermittently vent the receiver as it is being cleaned.

16. A refrigerated receiver for cooling milk and separating it from vacuum in an automatic milking line, said receiver being substantially cylindrically shaped with a heat exchanger disposed therein, said heat exchanger comprising a coiled plate having multiple turns, said heat exchanger including a superheating section substantially separated from the rest of the heat exchanger by baffle means, a warm milk inlet at the top of the receiver and positioned to direct the flow of the milk directly onto the coiled plate, a vacuum outlet, a cool milk outlet at the bottom of the receiver, and means to operate the heat exchanger in a heating mode during a cleaning cycle to heat a cleaning fluid as it is circulated through the receiver.

17. The receiver unit of claim 16 further comprising means to visually inspect a substantial portion of the surface of said heat exchanger as it remains disposed within said receiver unit.

18. The receiver unit of claim 16 wherein said heat exchanger is a coiled plate type and is substantially vertically disposed within said receiver and supported by its upper end therefrom.

19. The receiver unit of claim 16 wherein said heat exchanger is oriented within said receiver so that a substantial portion of its heat exchanging surface is parallel to the direction of milk flow through said receiver, thereby minimizing turbulence in the milk as it passes therethrough.

20. The receiver unit of claim 16 wherein said heat exchanger is arranged to permit stratification of milk within the receiver as it is cooled.

21. The receiver unit of claim 16 wherein said heat exchanger has a refrigerant inlet and a refrigerant outlet, and baffle means in said exchanger to ensure that refrigerant flows through a substantial portion of said exchanger.

22. The receiver unit of claim 16 further comprising means to agitate cleaning liquid in said receiver as it is being circulated therethrough.

23. The receiver unit of claim 16 further comprising a direct expansion refrigeration system operatively connected to said heat exchanger.

24. The receiver unit of claim 23 wherein said refrigeration system has means to deliver either heated refrigerant to thereby operate said heat exchanger in a heating mode, or cooled refrigerant to thereby operate said heat exchanger in a cooling mode.

25. The receiver unit of claim 24 wherein said refrigeration unit includes a second heat exchanger, a compressor, and valve means to direct the flow of refrigerant from said compressor to either of said heat exchangers.

26. The receiver unit of claim 25 wherein said heat exchangers function as a condenser and an evaporator, said valve means having means to redirect the flow of refrigerant in said refrigeration system to change the function of said heat exchangers.

27. The receiver unit of claim 16 further comprising means to maintain a liquid seal at said outlet.

28. The receiver unit of claim 27 wherein said receiver has means to sense the level of milk therein, said sensing means having means to control the flow of milk through the receiver outlet in response thereto.

29. The receiver unit of claim 28 wherein said sensing means includes at least one probe extending into said receiver.

* * * * *